(12) United States Patent
Jahromi

(10) Patent No.: US 11,692,792 B2
(45) Date of Patent: Jul. 4, 2023

(54) RIFLESCOPE WITH OPTICAL AIMING CORRECTOR

(71) Applicant: Omid S Jahromi, Playa Vista, CA (US)

(72) Inventor: Omid S Jahromi, Playa Vista, CA (US)

(73) Assignee: Aimpoint AB, Malmo (SE)

( * ) Notice: Subject to any disclaimer, the term of this patent is extended or adjusted under 35 U.S.C. 154(b) by 231 days.

(21) Appl. No.: 16/699,673

(22) Filed: Dec. 1, 2019

(65) Prior Publication Data

US 2021/0164758 A1    Jun. 3, 2021

(51) Int. Cl.
| | |
|---|---|
| G02B 23/00 | (2006.01) |
| G02B 5/04 | (2006.01) |
| F41G 1/033 | (2006.01) |
| F41G 1/473 | (2006.01) |
| G02B 23/14 | (2006.01) |
| G02B 23/16 | (2006.01) |
| G02B 23/02 | (2006.01) |
| F41G 1/38 | (2006.01) |

(52) U.S. Cl.
CPC .............. F41G 1/033 (2013.01); F41G 1/38 (2013.01); F41G 1/473 (2013.01); G02B 5/04 (2013.01); G02B 23/02 (2013.01); G02B 23/14 (2013.01); G02B 23/16 (2013.01)

(58) Field of Classification Search
CPC ........ G02B 23/00; G02B 23/02; G02B 23/14; G02B 23/16; G02B 5/04; F41G 1/033; F41G 1/38; F41G 1/473
USPC .................................................. 359/399–435
See application file for complete search history.

(56) References Cited

U.S. PATENT DOCUMENTS

| | | | | |
|---|---|---|---|---|
| 2,534,946 | A | 12/1950 | Bradley | |
| 4,118,109 | A * | 10/1978 | Crawford | G02B 26/108 359/196.1 |
| 6,473,250 | B1 * | 10/2002 | Chapman | G02B 26/0883 359/669 |
| 7,937,879 | B2 * | 5/2011 | Hamilton | F41G 1/38 42/132 |
| 8,749,887 | B2 | 6/2014 | Jahromi | |
| 9,164,269 | B1 | 10/2015 | Jahromi | |
| 9,644,920 | B2 | 5/2017 | Jahromi | |
| 10,502,530 | B1 | 12/2019 | Jahromi | |
| 2003/0164952 | A1 * | 9/2003 | Deichmann | B33Y 50/00 356/603 |
| 2005/0039370 | A1 | 2/2005 | Strong | |

(Continued)

*Primary Examiner* — Thong Q Nguyen

(57) ABSTRACT

This invention discloses a riflescope wherein the point of aim is adjusted by a pair of partially-rotating wedge prisms. The prisms are positioned in front of the objective lens of the riflescope. The deviation axes of the prisms are oriented perpendicular to each other such that one deviates the light beam in the horizontal direction and the other in the vertical direction. It is shown, using the geometric properties of a tangent to a circle, that rotating each prism by a small amount can produce an approximately linear shift in the point of aim of the riflescope.

The riflescope introduced in this invention has no laterally-moving parts, no turrets and no off-axis optical components. Therefore, it provides a very robust and reliable point of aim. Additionally, the riflescope has a streamlined body which is aesthetically pleasing and easier to mount on the long receiver of magnum hunting rifles.

12 Claims, 14 Drawing Sheets

(56) References Cited

U.S. PATENT DOCUMENTS

| | | | |
|---|---|---|---|
| 2005/0115089 A1* | 6/2005 | Johnson | F41G 1/467 33/265 |
| 2016/0116254 A1* | 4/2016 | Jahromi | F41G 11/00 42/111 |
| 2019/0293919 A1* | 9/2019 | Hamilton | G02B 23/16 |

* cited by examiner

RIFLESCOPE WITH OPTICAL AIMING CORRECTOR

I. CROSS-REFERENCE TO RELATED APPLICATIONS

Not Applicable

II. FIELD OF THE INVENTION

This invention relates to optical weapon sights such as riflescopes which superimpose a reticle pattern on an image of the target.

III. BACKGROUND OF THE INVENTION

A riflescope is an optical weapon sight used for precision aiming. Essentially, a riflescope is a Keplerian telescope with a reticle or cross hairs added to mark the "point of aim". In shooting and hunting literature, a riflescope is also called a "scope" for short.

A riflescope must be mounted on a rifle such that its point of aim is aligned with the rifle's barrel. In practice, it is hardly possible to achieve a precise alignment due to mechanical tolerances. The trajectory of the bullet must be considered as well. In view of these considerations, riflescopes often include a mechanism to make precise vertical and horizontal adjustments to the point of aim. In riflescope literature, an adjustment in the horizontal direction is called "windage adjustment", a vertical adjustment is called "elevation adjustment". Riflemen usually adjust a scope for elevation and windage by test shooting the rifle at a shooting range. This process is called "zeroing-in".

A. Mechanical Adjustment Methods

Early riflescopes were equipped with external adjustment mechanisms built into the mounts. Their point of aim was adjusted by micrometer windage and elevation mechanisms that tilted the entire scope laterally and/or vertically. An advantage of an externally-adjusted riflescope is that all the lens elements and the reticle remain centered on the same optical axis, providing highest image quality. A disadvantage of this solution is that the precision micrometer movements must be able to support the entire riflescope under recoil. The external adjustment mechanism is also bulky, heavy and susceptible to mud and dirt when used in the field.

Most modern riflescopes use an internal-adjustment mechanism. Two rotating knobs (turrets) protruding from the main body of the scope allow the shooter to adjust the precise lateral position of the reticle inside the riflescope. Turning the knobs moves the reticle assembly inside the main tube against spring pressure. The knobs have clearly marked graduations around their circumference and many have a ball-detent system that "clicks" as they are turned. Each graduation or click represents a change in reticle position such that the point of aim is shifted by a small amount on the target. In modern riflescopes the graduations are commonly expressed as 1 cm at 100 m or 0.5 inch at 100 yards.

The opto-mechanical design of a typical riflescope with internal-adjustment mechanism is shown in FIG. 1. With reference to this figure, a riflescope is comprised of an objective lens 1 which forms a real image of the target at its focal plane. The image produced by the objective lens is upside down and laterally-reversed. An erector system comprising a pair of converging lenses 3a and 3b converts the image formed by the objective lens into an upright and laterally-correct real image. An eyepiece lens 5 receives the image produced by the erector system and converts it into a magnified virtual image for the shooter to see.

FIG. 1 shows a reticle 20 being positioned at the objective focal plane. It is possible to position the reticle at the eyepiece focal plane as well. In either case, the shooter will see an image of the reticle superimposed on the image of the target. The erector lenses 3a and 3b are mounted inside an inner tube 6 which is attached to the main riflescope housing 30 via a hinge 37. The front end of inner tube 6 can tilt in both vertical and horizontal directions while being supported from the top by an elevation knob 38 and from the side by a windage knob (not shown). A leaf spring 9 presses the inner tube 6 against the elevation and windage knobs so that its front end follows the lateral movements of these two knobs.

The purpose of the opto-mechanical arrangement shown in FIG. 1 is to make sure that the erector lens move together with the reticle so that the reticle always appears centered when viewed through the eyepiece. See U.S. Pat. No. 2,949,816 granted to W. R. Weaver (Aug. 23, 1960), U.S. Pat. No. 2,955,512 granted to Ernst Kollmorgen and John L. Rawlings (Oct. 11, 1960), and U.S. Pat. No. 3,161,716 granted to D. J. Burris et al. (Dec. 15, 1964). While invented more than 60 years ago, this mechanism is still widely used for elevation and windage adjustment in riflescopes.

The mechanical adjustment method described above has several fundamental weaknesses. Two notable weaknesses are:

(a) When the rifle fires, the inner tube assembly is momentarily detached from the supporting surfaces of the elevation and windage knobs due to the sudden movement of the riflescope under recoil. The leaf spring 9 brings the inner tube assembly back into contact with the elevation and windage knobs once the rifle settles. Assuming that the objective lens of the riflescope has a focal length of 6 inches, a positioning error of just 0.002 of an inch can produce a noticeable shift of more than 1 inch in the point of impact at 100 yards. This level of mechanical precision is hard to achieve (and harder to maintain) in a riflescope.

(b) When the inner tube 6 is tilted to provide elevation or windage adjustment, the erector lenses 3a and 3b become decentered with respect to the objective optical axis. In telescope design, decentering the lenses is a cardinal sin: various optical aberrations such as coma and astigmatism will be introduced and image sharpness will be lost.

As a result of weaknesses (a), elevation and windage adjustments even in highest-priced riflescopes currently on the market are not repeatable. This problem has become known in recent years and is referred to as "zero retention problem" or "tracking problem" in the hunting and shooting literature. Weakness (b) is not widely-known or discussed in the literature on riflescopes.

FIG. 2 shows a variation of the riflescope shown in FIG. 1 wherein the erector lenses are replaced by an erector prism 17. Several types of image-erecting prisms such as Schmidt-Pechan or Abbe-Koenig can be used for this purpose. A riflescope that uses a prism erector can be constructed more compactly than one using a lens-based erector system. Due to this advantage, this type of riflescope is often mounted on carbine-size combat rifles. The method of providing elevation and windage adjustment in these types of riflescopes is similar to the method described above: The erector prism (or some other parts of the optical system) is mounted in a separate assembly unit and then mechanically tilted or shifted to provide an adjustment. The weaknesses mentioned with regards to the system in FIG. 1 apply to this system as well.

B. Optical Adjustment Methods

In recent years, a series of optical adjustment methods have been devised by the present inventor replace the mechanical adjustment method described above. These methods include:

I. movable wedge prisms being positioned between the objective lens and its focal plane (U.S. Pat. No. 8,749,887 issued on Jun. 10, 2014), II. tiltable wedge prisms being positioned in front of the objective lens (U.S. Pat. No. 9,164,269 issued on Oct. 20, 2015), III. contra-rotating wedge prism pairs being positioned after the objective lens (U.S. Pat. No. 9,644,620 issued on May 9, 2017), and IV. attaching one or more wedge prisms in front of the objective lens as needed (U.S. patent application Ser. No. 15/990,815 submitted on May 28, 2018).

The first three solutions cited above utilize a pair of wedge prisms to adjust the riflescope's point of aim in each direction (horizontal or vertical). The fourth solution suggests attaching one or more wedge prisms (selected from a pre-designed collection) during the zeroing-in process. It may not be convenient to use this latter solution if a re-adjustment is required in the field (e.g. due to a change in the type or brand of the ammunition used). Therefore, a need still exists for an optical elevation and windage correction solution which uses a minimal number of wedge prisms and is adjustable in the field.

IV. SUMMARY OF THE INVENTION

This invention discloses a riflescope wherein the point of aim is adjusted by a pair of thin wedge prisms. The prisms are positioned in front of the objective lens such that one prism deviates the line of sight in the horizontal direction and the other in the vertical direction. It is shown, using the geometric properties of a tangent to a circle, that rotating each prism by a small amount (say ±10°) produces a practically straight shift in the point of aim of the riflescope.

V. DEFINITIONS

The process of adjusting or correcting the line of sight of a riflescope such that the point of aim (POA) shown by the riflescope matches the point of impact (POI) of the weapon is called "zeroing-in". Since a rifles bullet follows a ballistic trajectory, a rifle is zeroed-in at a known distance, say 100 m. At common shooting distances (say 0 to 300 m), the rifle's point of impact will be slightly above or below the point of aim. The "line of sight" is a hypothetical line or axis that extends from the riflescope towards the point of aim as designated by the cross-hairs inside the riflescope.

This invention is concerned with manipulations of the line of sight by very small angles. Small angles are measured in minutes of arc (MOA) or milliradians (mil). For the purpose of zeroing-in a riflescope, 1 MOA is considered to be equal to an angle subtended by a 1 inch line at 100 yards. Similarly, 1 mil corresponds to the angle subtended by a 10 cm line at 100 m.

In the diagrams, the horizontal direction is represented by the x-axis while the vertical direction is represented by the y-axis. The z-axis usually points towards the target and is considered being the same as the telescopic sight's optical axis. Angles will be denoted by lower case Greek letters. Vectors are denoted in lowercase boldface. In the Euclidean space, a deviation vector a is represented by its Cartesian coordinates $(a_x, a_y)$ or polar coordinates $(\alpha, \omega)$ where $\alpha \triangleq \|a\|$ is the magnitude and $\omega \triangleq \angle a$ is the angle (orientation) associated with said deviation vector.

Positions of optical elements are described with reference to the direction of light propagation. Therefore, when element A is said to be before element B, this means light will pass through element A before entering element B.

VI. BRIEF DESCRIPTION OF THE DRAWINGS

FIGS. 7(a) through 7(d) are computer-generated simulations that show the convergence of iterative zeroing using a riflescope according to the invention.

Figure 8A:
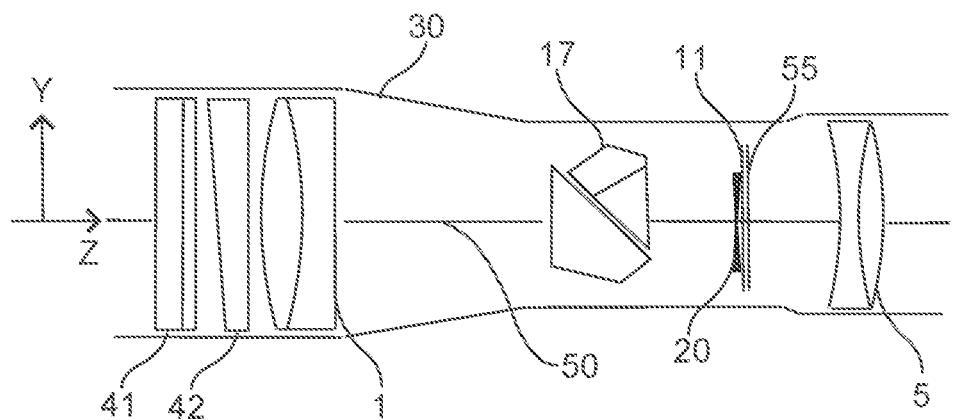
Figure 8B:
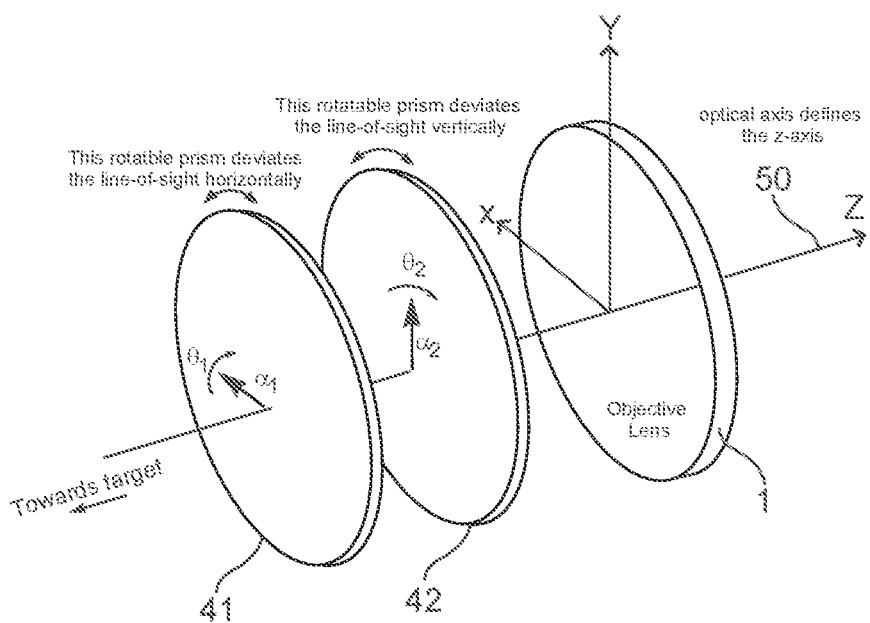

FIGS. 8(a) and 8(b) show a first preferred embodiment of a riflescope according to the invention.

Figure 9A:
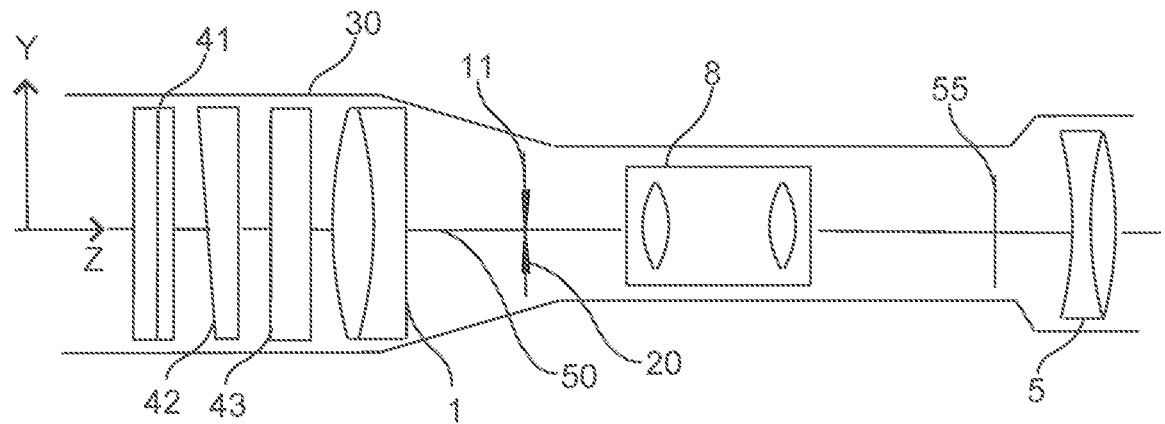
Figure 9B:
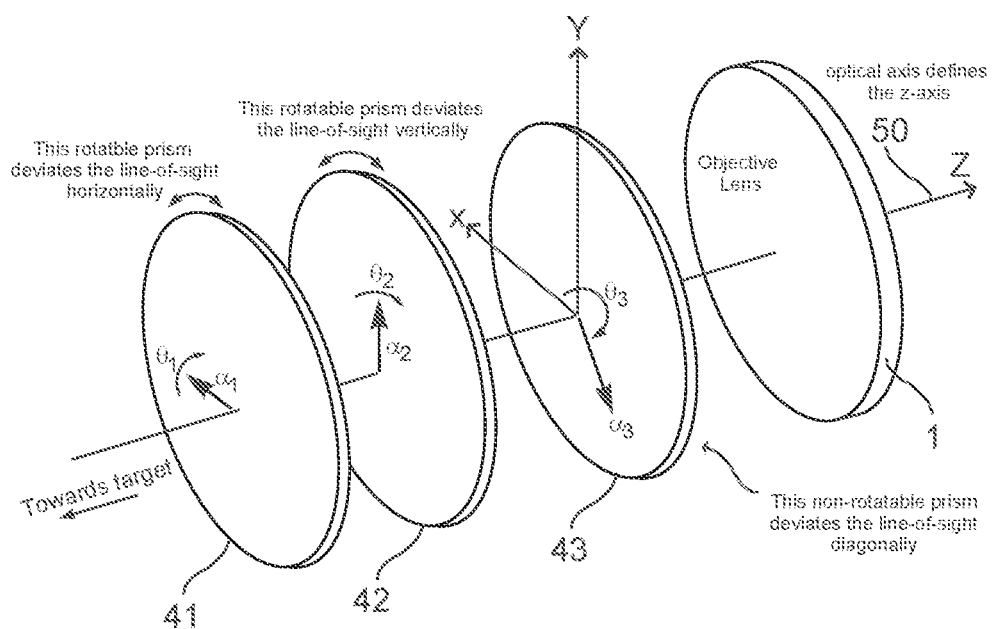

FIGS. 9(a) and 9(b) show a second preferred embodiment of a riflescope according to the invention.

Figure 10:
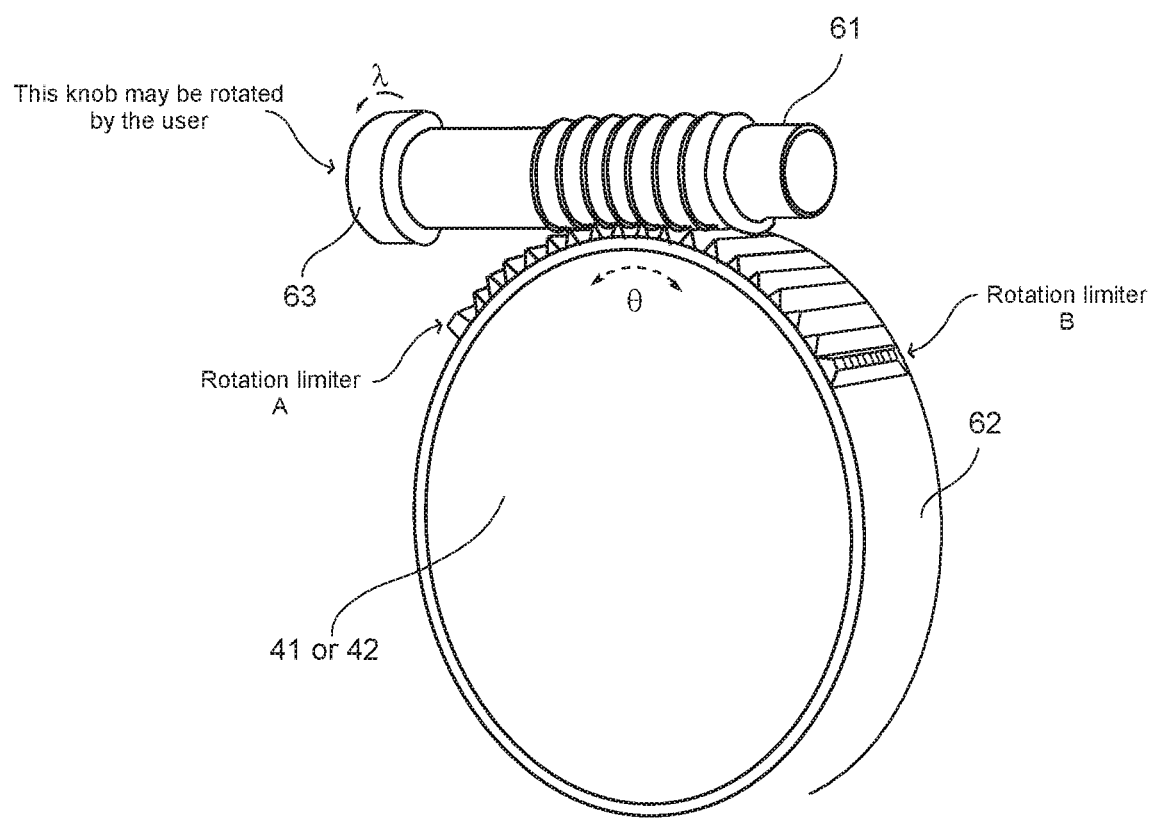

FIG. 10 shows a worm drive mechanism for rotating the wedge prisms according to the invention.

Figure 11:
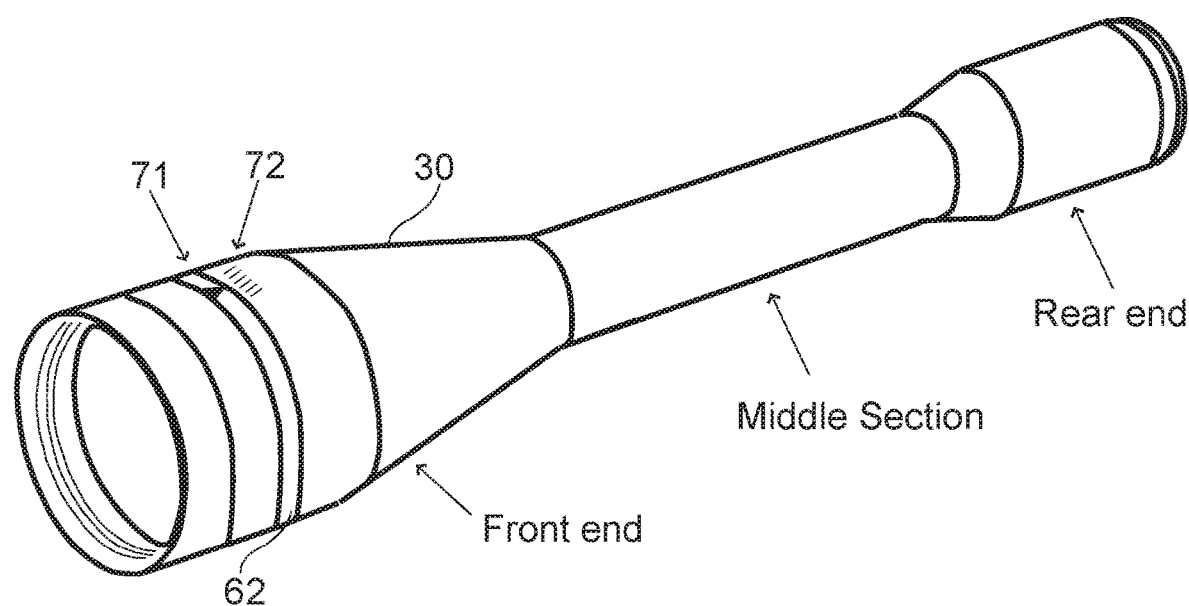

FIG. 11 is a perspective view illustrating the outer body of a riflescope according to the invention. This figure also shows the indicia that inform the user of the amount of elevation or windage adjustments dialed in the riflescope.

Figure 12A:
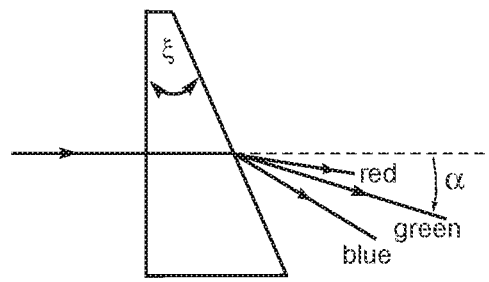
Figure 12B:
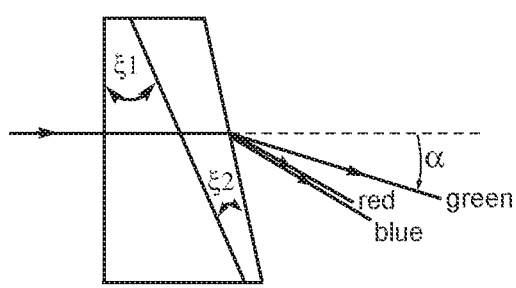

FIGS. 12(a) and 12(b) show color separation in a wedge prism and how it can be reduced by using an achromatic prism.

VII. THEORY OF OPERATION

The present invention is based on the confluence of several distinct observations and principles from optics, geometry, and mathematics. These principles are briefly described below.

A. Principle of Constant Beam Deviation by a Thin Wedge Prism

When a ray of light enters a transparent material such as glass, the ray's direction is deflected, based on both the entrance angle (measured relative to the normal to the surface) and the material's refractive index in accordance to Snell's law. A beam passing through a wedge prism is deflected twice: once entering, and again when exiting. The sum of these two deflections produces the deviation angle $\alpha$ which is given by $$\alpha = \phi - \xi + \sin^{-1}(\sqrt{n^2 - \sin^2\phi} \times \sin\xi - \sin\phi\cos\xi). \quad (1)$$

Figure 3A:
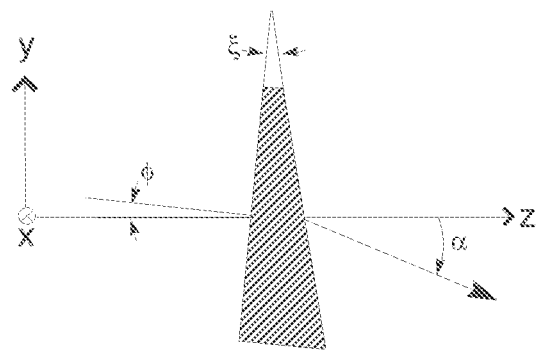
FIG. 3(a) is a side-view diagram showing the principle of light deviation by a thin wedge prism.

In the above formula α is the beam deviation angle, ξ is the apex angle of the prism, φ is the incidence angle of the incoming beam as shown in FIG. 3(a). The parameter n represents the index of refraction of the glass material used for making the prism. When the incident light is close to normal to the prism surface (i.e. when φ≈0) and for a thin prism (i.e. when ξ≤6°), (1) reduces to $$\alpha = (n-1)\xi. \quad (2)$$

Riflescopes have a relatively limited real field of view ranging from about 2° to about 10°. Therefore, if a thin wedge prism with a very small apex angle is positioned in front of the objective lens of a riflescope, the incidence angle φ will be less than ±5° and (2) will be valid. This means the deviation produced in the line of sight will be solely determined by the prism's apex angle ξ and glass index of refraction n.

As shown in FIG. 3(a), a wedge prism deflects light towards its base. In this invention we define a hypothetical axis which connects the apex of a prism to its base and call it the "deviation axis". We use the terms "direction" or "orientation" to refer to the angle between a prism's deviation axis and a reference coordinate axis such as the x axis. The deviation angle α associated with a wedge prism will be called "deviation power" or "deviation magnitude".

B. Principle of Vector Beam Deviation by Two Rotatable Wedge Prisms

Figure 3B:
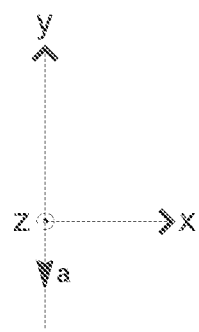
FIG. 3(b) is a diagram illustrating the abstract representation of a wedge prism's deviation by a vector.

The constant deviation property described above allows us to represent the deviation produced by a thin wedge prism as a vector a in the coordinate space. With reference to FIG. 3(b), the magnitude $\|a\|$ of this vector represents the deviation power and the angle ∠a represents the direction or orientation in which the prism deviates the line of sight.

Figure 4:
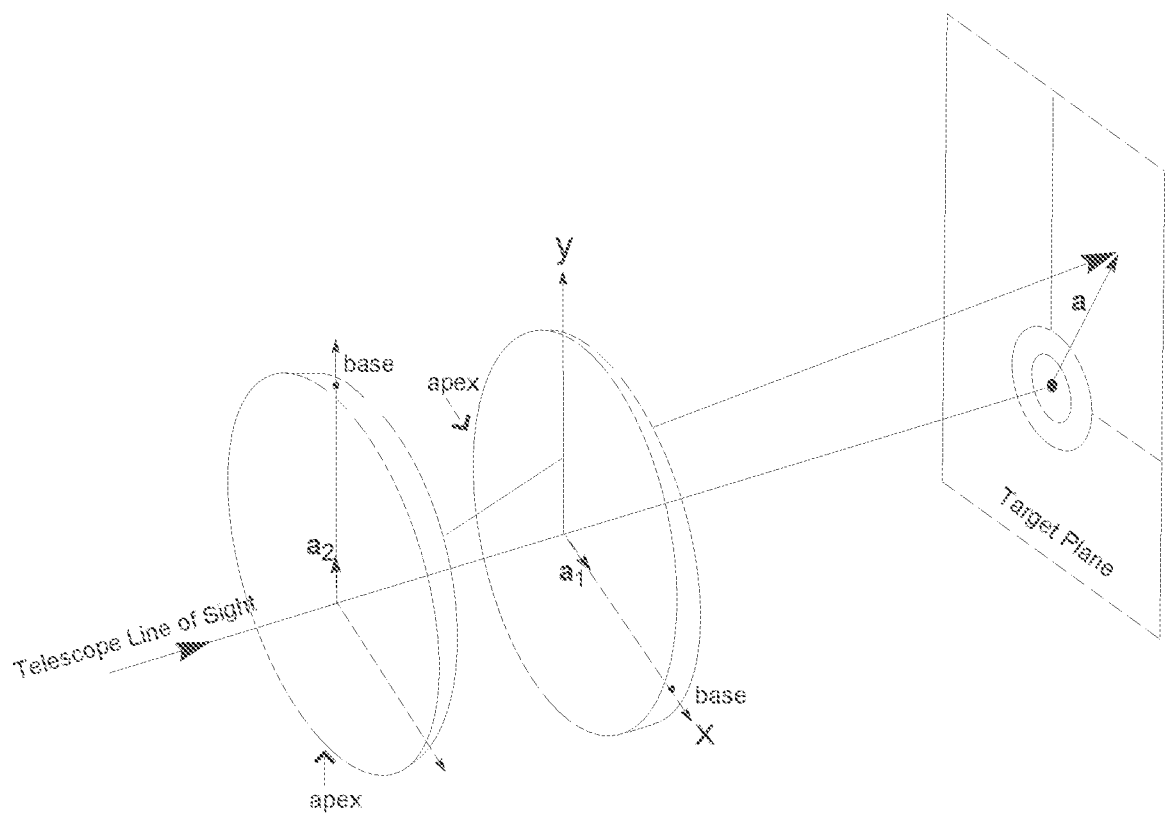
FIG. 4 is a perspective-view diagram showing vector addition of deviations produced by two wedge prisms in three-dimensional space.

With reference to FIG. 4, let vectors $a_1$ and $a_2$ represent two wedge prisms positioned in front of a riflescope's objective lens. The total deviation a resulting from this arrangement will be given by $$a = a_1 + a_2. \quad (3)$$

The above equation can be expanded such that the cartesian coordinates $(a_x, a_y)$ of the resulting total deviation are expressed in terms of the deviation powers $\alpha_1 = \|a_1\|$ and $\alpha_2 = \|a_2\|$ and the orientation angles $\omega_1 = \angle a_1$ and $\omega_2 = \angle a_2$ of the two wedge prisms:

$$a_x = \alpha_1 \cos \omega_1 + \alpha_2 \cos \omega_2$$

$$a_y = \alpha_1 \sin \omega_1 + \alpha_2 \sin \omega_2 \quad (4)$$

The arrangement shown in FIG. 4 is often called "Risley prism pairs" after Dr. Samuel D. Risley who discovered in late nineteenth century that rotatable wedge prisms can be used for beam steering [1]. A Risley prism pair can produce variable linear deviation if the two prisms have equal power and are rotated in equal but opposite directions. However, recent research has revealed several difficulties which will arise if this method is used for high-precision beam steering [2], [3].

In theory, two rotatable prisms can produce any desired deviation amount from a minimum of $|\alpha_1 - \alpha_2|$ to a maximum of $\alpha_1 + \alpha_2$ in any desired direction. However, full-range two-dimensional beam steering using Risley prisms is not practical because the inverse problem of finding the rotation angles $\omega_1$ and $\omega_2$ such that the point-of-aim is moved to a given location $(a_x, a_y)$ is "ill-posed".

The mathematical term "well-posed" stems from a definition given by French mathematician Jacques Hadamard (1865-1963). He believed that mathematical models of physical phenomena should have the properties that:
   a solution exists,
   the solution is unique,
   the solution's behavior changes continuously with the initial conditions.

Problems that fail to satisfy all of Hadamard's conditions are termed "ill-posed". Solving the inverse of the system of nonlinear equations (4) is an ill-posed problem because the solution is not unique. Furthermore, the solutions are not continuous functions of the coordinate data $(a_x, a_y)$ [4], [5], [6], [7].

In the next subsection, we introduce additional restrictions to the above problem in order to provide a well-posed beam deviator solution suitable for use in a riflescope.

C. Principle of Approximating an Arc of a Circle by a Straight Line

Figure 5A:
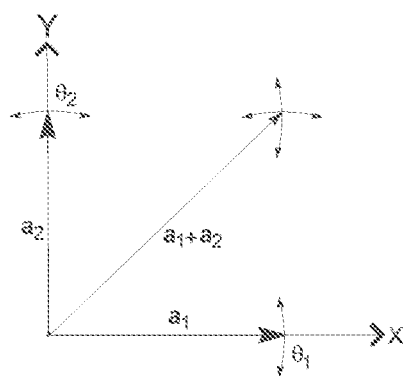
FIG. 5(a) is a diagram illustrating vector summation of deviations created by two orthogonally-oriented wedge prisms.

Consider the vector diagram shown in FIG. 5(a). This diagram can be considered as an abstract representation of the two-prism optical arrangement shown in FIG. 4 where the wedge prism whose deviation axis is oriented horizontally is represented by the vector $a_1$ and the wedge prism whose deviation axis is oriented vertically is represented by the vector $a_2$. At this "rest position", the prisms' orientation axes are perpendicular and the resulting total deviation is given by $a_1 + a_2$ as explained before.

Figure 5B:
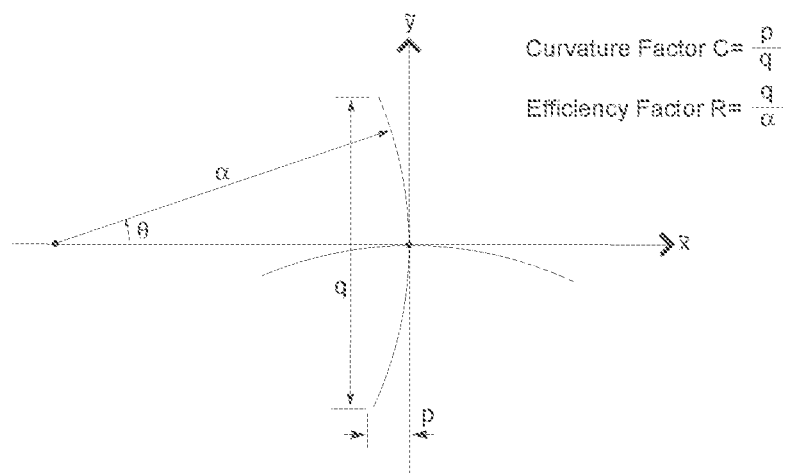
FIG. 5(b) is a diagram illustrating the "perturbation parts" of the deviations created by two orthogonally-oriented wedge prisms when the prisms are rotated by small angles.

Now imagine that we "perturb" the orientation of the prisms slightly by rotating the horizontally-oriented prism by a small angle $\theta_1$ or by rotating the vertically-oriented prism by a small angle $\theta_2$ as shown in FIG. 5(a). In either case, the total deviation vector will move in the x-y plane along an arc of a circle. With reference to FIG. 5(a), the vector $a_1 + a_2$ will move along a vertical arc when the horizontal prism $a_1$ is rotated and along a horizontal arc when the vertical prism $a_2$ is rotated. FIG. 5(b) shows only the "perturbation component" of $a_1 + a_2$ when the prisms are perturbed via small rotations. This is to say, the coordinates in this figure are referenced to the position of $a_1 + a_2$ when $\theta_1$ and $\theta_2$ are zero.

With reference to FIGS. 5(a) and 5(b), the horizontal and vertical perturbation components $(\tilde{x}, \tilde{y})$ resulting from rotating the two prisms are given by $$\tilde{x} = \alpha_2 \sin \theta_2 + \alpha_1 (\cos \theta_1 - 1)$$

$$\tilde{y} = \alpha_1 \sin \theta_1 + \alpha_2 (\cos \theta_2 - 1) \quad (5)$$

For small angles and when the angles are measured in radian, $\sin \theta \approx \theta$ and $\cos \theta \approx 1$. Therefore, for small rotation angles the above formulae can be simplified as $$\tilde{x} \approx \alpha_2 \theta_2 (\theta_2 \text{ small})$$

$$\tilde{y} \approx \alpha_1 \theta_1 (\theta_1 \text{ small}) \quad (6)$$

The above formulae show that we can produce a "practically horizontal" shift in the line of sight by rotating the vertically-oriented wedge prism and a "practically vertical" shift in the line of sight by rotating the horizontally-oriented wedge prism. In the present invention, the approximation of $\sin \theta$ with $\theta$ is not critical. The critical requirement is that the magnitude of the interference terms $\alpha_1(\cos \theta_1 - 1)$ and $\alpha_2(\cos \theta_2 - 1)$ are kept small so that rotating the prisms individually would produce a straight shift to the point of aim.

With reference to FIG. 5(b), let's call the maximum amount of undesired perturbation p. Similarly, let's define q as the maximum amount of desired perturbation caused when a wedge prism is rotated whiting a predefined range $\pm \theta_{max}$. From (5), it follows that $$p = \alpha(1 - \cos(\theta_{max}))$$

$$q = 2\alpha \sin(\theta_{max}) \quad (7)$$

The curvature factor C is then defined as p/q:

$$C = \frac{\alpha(1 - \cos(\theta_{max}))}{2\alpha\sin(\theta_{max})} = \frac{2\sin^2\left(\frac{\theta_{max}}{2}\right)}{2 \times 2\sin\left(\frac{\theta_{max}}{2}\right)\cos\left(\frac{\theta_{max}}{2}\right)} = \frac{1}{2}\tan\left(\frac{\theta_{max}}{2}\right) \quad (8)$$

The curvature factor C effectively measures the belly to height ratio of the perturbation arc produced by rotating each prism. It increases approximately linearly as the rotation range is increased:

$$C = \frac{1}{2}\tan\left(\frac{\theta_{max}}{2}\right) \approx 0.00436 \times \theta_{max} \text{ if } \theta_{max} < 45° \quad (9)$$

The table below shows the curvature factor expressed as a percentage for several representative rotation ranges:

TABLE I

| Prism Rotation Range | ±5° | ±10° | ±15° | ±30° | ±45° |
|---|---|---|---|---|---|
| Curvature Factor C | 2% | 4.3% | 6.5% | 13% | 20% |

The curvature factor C is very helpful when designing the proper rotation range. Obviously, smaller values for C are preferred but the designer must also consider the range of useful adjustments the system can provide. To help quantify the relation between rotation range and the maximum useful adjustment provided, we define the efficiency factor R as the ratio of the desired deviation range q to the prism's intrinsic deviation power $\alpha$:

$$R = \frac{q}{\alpha} = 2\sin(\theta_{max}) \quad (10)$$

The efficiency factor R increases approximately linearly with rotation range as shown in Table II below:

TABLE II

| Prism Rotation Range | ±5° | ±10° | ±15° | ±30° | ±45° |
|---|---|---|---|---|---|
| Efficiency Factor R | 17% | 35% | 52% | 100% | 140% |

A person skilled in the art can use the formulae provided above to design an optically adjustable riflescope that suits a wide variety of applications. To illustrate the design process, we will provide three sample designs below. In the first example, we limit the allowable rotation range of the prisms to ±10°. In the next two examples, we increase the rotation range to ±15° and ±30°, respectively. The performance criteria for these three designs is the same: Design a partially rotatable wedge prism system that deviate the point of aim of a riflescope within a square range 1 m wide and 1 m tall at a distance of 100 m.

EXAMPLE 1

(Prisms rotation range ±10°) From Table II above, the efficiency factor for this rotation range is 35%. Therefore, to cover an adjustment range of 1 m at 100 m, the prisms must have an intrinsic deviation power of 1/0.35=2.85 m at 100 m. This is equal to an angular deviation power of $\alpha$=28.5 MIL or 96 MOA. Assuming that the prisms are made of BK7 (a popular optical glass with a refraction index n≈1.5), the simplified prism formula (2) implies that the apex angle of the prisms should be 192 MOA or 3.2°.

From Table I, we find that the curvature factor for a system with maximum rotation range of ±10° is 4.3%. This means the interference between elevation and windage adjustments will be at most 4.3 cm at the full adjustment range of 1 m. The interference error is significantly less near the center of the adjustment range so the maximum value of 4.3 cm is quite acceptable.

The industry standard for adjustment resolution (click value) in riflescopes is 1 cm at 100 m (0.1 MIL) in Europe and ½ MOA in the United States. If we accept the European standard of 1 cm per click, there the prisms' mount must be able to provide a rotational resolution of 20°/100=0.2°.

EXAMPLE 2

(Prisms rotation range ±15°) Following the same process as described in Example 1, the deviation power of the prisms should now be 1/0.52=1.927 m at 100 m. This is equal to an angular deviation power of $\alpha$=19 MIL or 65 MOA. From (2), it follows that the apex angle of the prisms should be 130 MOA or 2.15°.

The curvature factor for a rotation range of ±15° is 6.5%. This means the interference error will be at most 6.5 cm. For this design, the prisms' mount must be able to provide rotational resolution of 30°/100=0.3°.

EXAMPLE 3

(Prisms rotation range ±30°) From Table II, the deviation power of the prisms should now be 1 m at 100 m. This is equal to an angular deviation power of $\alpha$=10 MIL or 34.4 MOA. From (2), the apex angle of the prisms should be 69 MOA or 1.1°.

The curvature factor for a rotation range of ±30° is 13%. This means the interference error will increased to 13 cm which is more than the previous two designs but still acceptable. The benefit of allowing a larger rotation range is that the rotation resolution can be decreased: For this design, the prisms' mount should have a rotational resolution of 60°/100=0.6° which can be very easily achieved.

The prism specifications and the resulting interference error for each design choice are summarized in Table III below. As seen in this table, an increased rotation range allows the use of thinner prisms (apex angle is decreased). It also relaxes the required rotational precision so the prism mounts become easier to design and manufacture. However, the amount of interference between elevation and windage adjustments increases. While an increased interference might seem unacceptable at first, we will demonstrate in Section VII-E that interference is not as critical as it may seem. This is because a user can repeat the adjustment process to get an exact zero even when a non-negligible amount of interference between elevation and windage adjustments exists.

TABLE III

| Allowable Rotation Range | ±10° | ±15° | ±30° |
|---|---|---|---|
| Prisms Apex Angle | 3.2° | 2.15° | 1.1° |
| Maximum Interference Error | 4.3 cm | 6.5 cm | 13 cm |
| Required Rotational Resolution | 0 2° | 0.3° | 0.6° |

D. Principle of Producing Zero Net Deviation Using a Third Wedge Prism

In the previous section we described, an adjustment method, for riflescopes wherein two rotatable wedge prisms with very small apex angles are positioned such that one prism's deviation axis points in the horizontal direction and the other one's deviation axis points in the vertical direction (see FIGS. 4 and 5(*a*)). We then showed that if any of the prisms are rotated around the optical axis by a small angle, a straight shift in the point of aim is produced.

Figure 6:
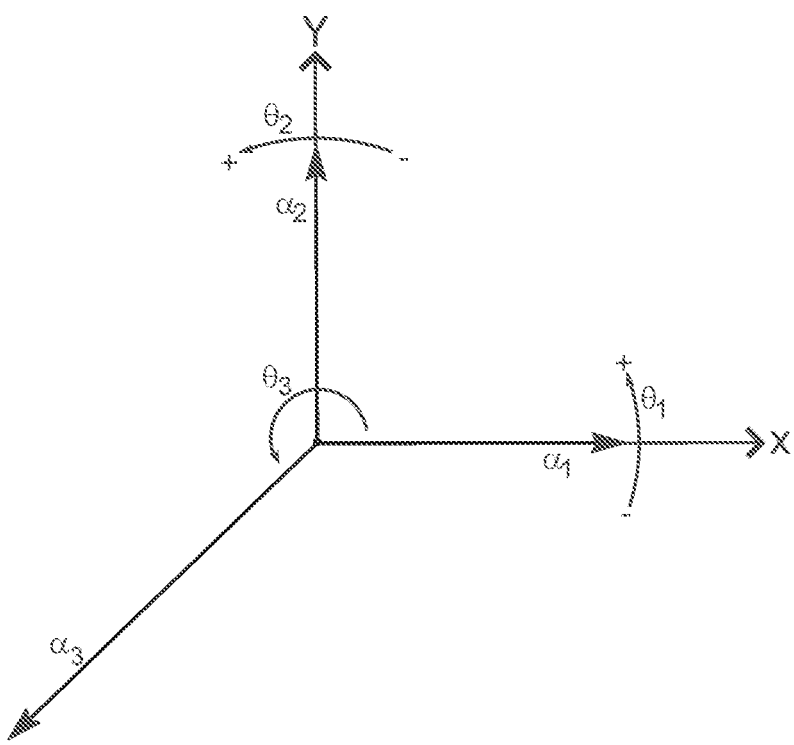
FIG. 6 is a diagram showing how the "base parts" of the deviations created by two orthogonally-oriented wedge prisms can be cancelled using a third wedge prism.
Figure 7A:
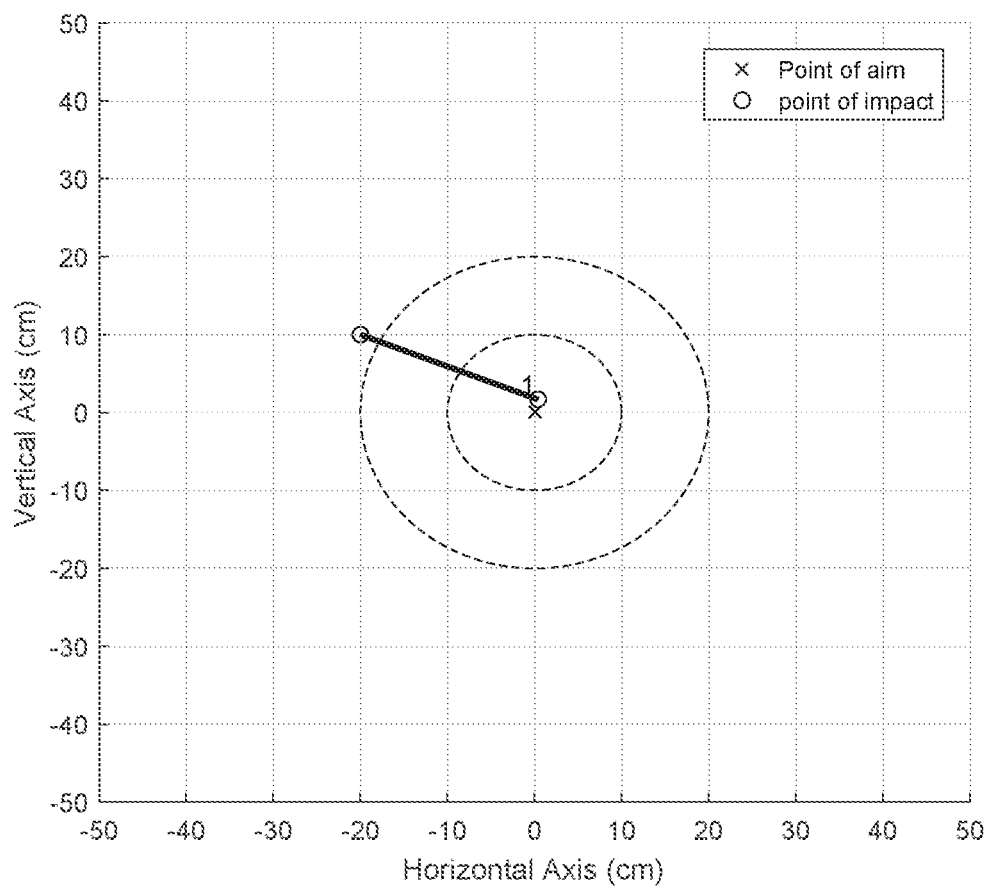
Figure 7B:
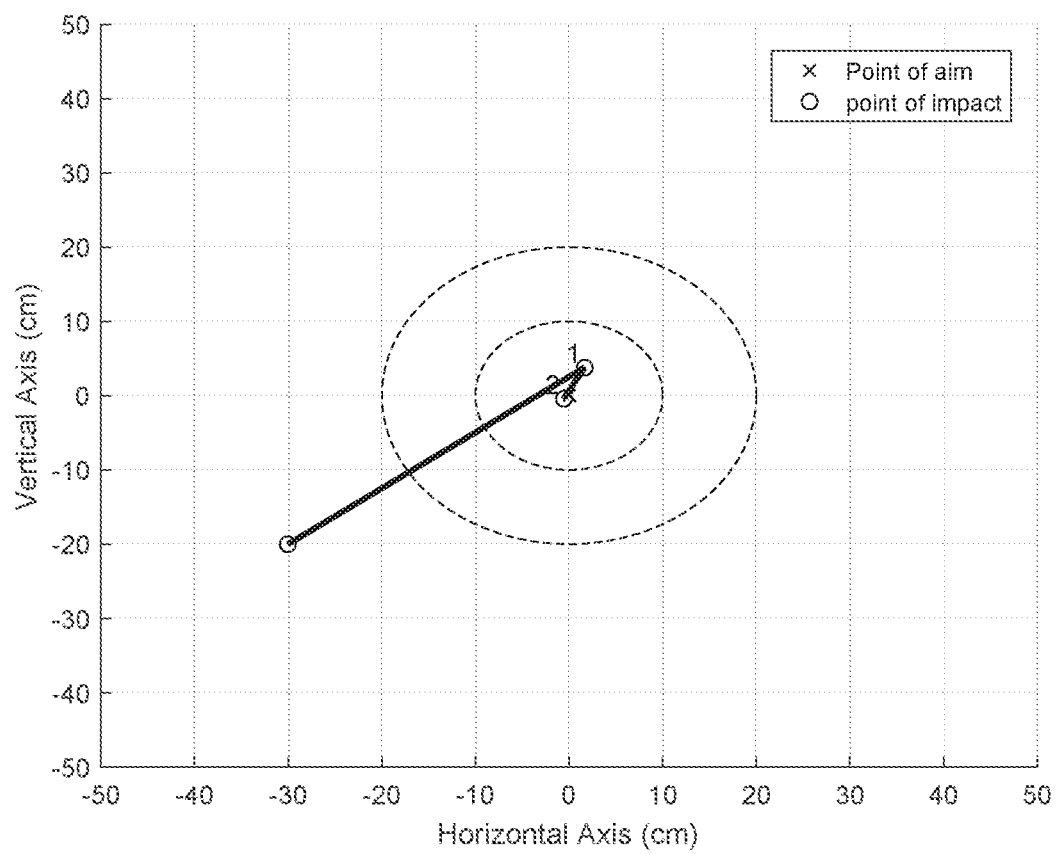
Figure 7C:
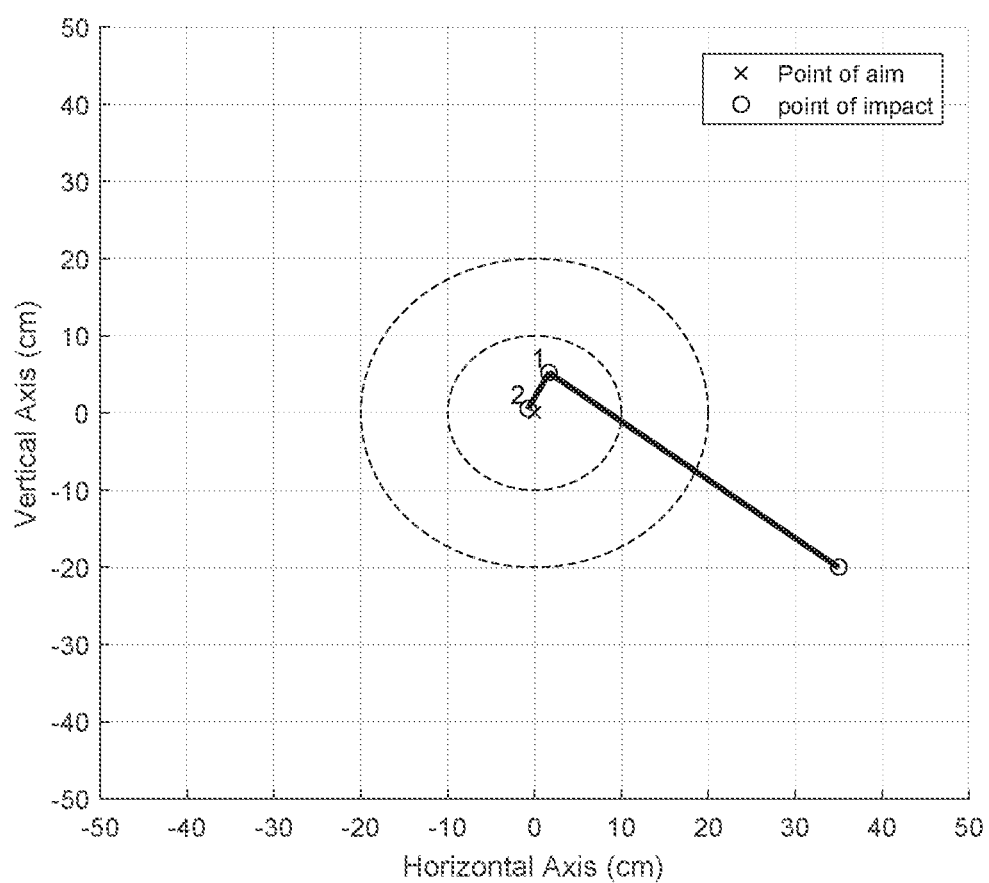
Figure 7D:
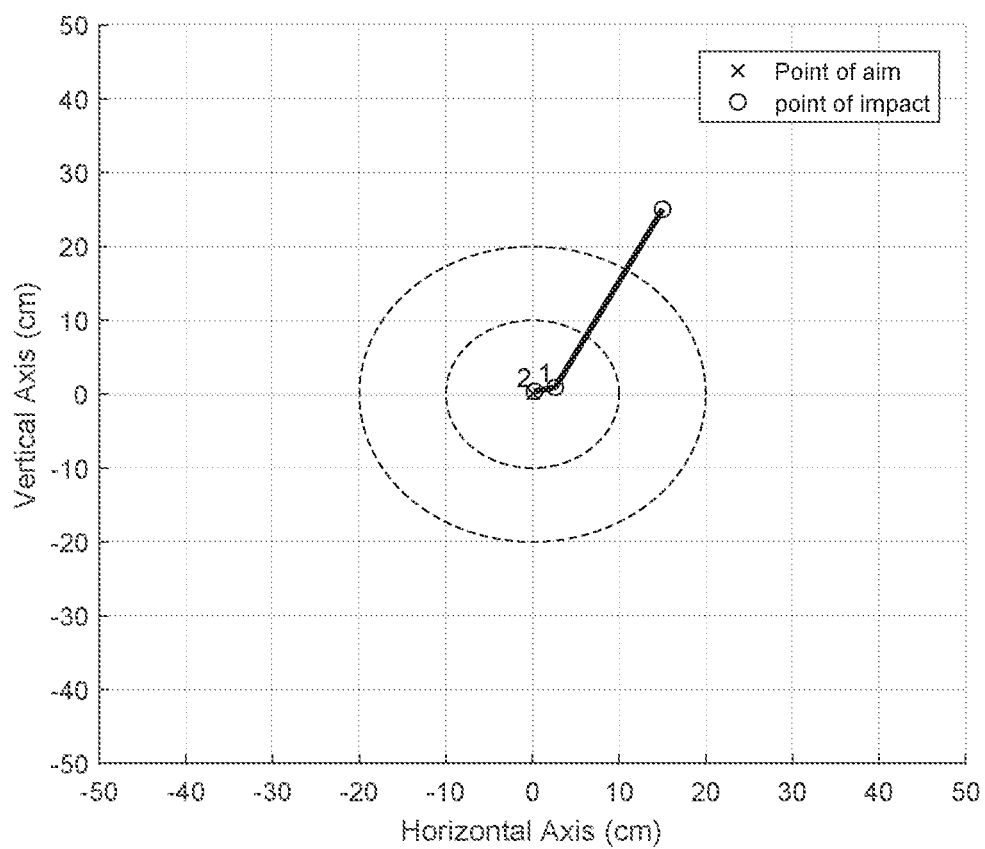

The straight shifts introduced as a result of rotating the prisms are small "differential" or "perturbation" components which are created in addition to the "base deviation" produced by each prism at zero-rotation position. In this invention, we only need these small perturbation components so we have to somehow cancel the base deviation produced by the two rotatable wedge prisms. One way to achieve zero net deviation when $\theta_1$ and $\theta_2$ are zero is to add a third non-rotating prism as shown in FIG. 6. This third prism, whose deviation is represented by the vector $a_3$, is selected such that its deviation cancels out the sum of base deviations produced by the two rotatable wedge prisms:

$$a_3 = -(a_1+a_2) \text{ when } \theta_1=\theta_2=0 \qquad (11)$$

For the purpose of the present invention, it is not critical if the third wedge prism is positioned before or after the rotatable wedge prisms. The addition of this third wedge prism provides an opportunity to cancel out much of the chromatic aberrations produced by the rotatable wedge prisms as well.

E. Principle of Convergence of Repeated Adjustments

In previous sections, we discussed that a three-prism beam deviation system as shown in FIG. 6 can be designed such that it produces zero net deviation in its rest position. We also discussed that the net deviation produced by this system can be approximated by a straight line if the rotatable prisms are rotated individually and by limited amounts.

In this section we demonstrate that even when a noticeable curvature in elevation and windage adjustments is allowed, the resulting interference error can be completely eliminated by repeating the zeroing-in process. This is to say, if a shooter zeros-in his rifle using a riflescope that works based on the approximation principle described in Section VII-C, he might not get a perfect zero the first time. But if he repeats the zeroing-in process (i.e. shoot the rifle again and adjust the prisms's rotation angle to compensate for the observed aiming error) he will get a perfect zero. In precise terms, we prove that the zeroing-in process shall converge to the exact solution if the rotation range of the prisms is less than ±45°.

A sufficient condition for a series of approximate solutions to converge to an exact solution is that the Euclidian distance between the approximate solution and the exact solution is reduced after each step. When applied to our optical beam steering system, this implies that the magnitude of the windage error produced when elevation is being adjusted must be smaller than the magnitude of elevation adjustment provided. Similarly, the magnitude of the elevation error produced when windage is being adjusted must be smaller than the magnitude of windage adjustment provided.

By differentiating the equations (5) we can calculate the differential contribution to elevation $d\tilde{y}$ and the differential contribution $d\tilde{x}$ to windage when the elevation prism is rotated by a small amount $d\theta_1$:

$$d\tilde{x} = (-\alpha_1 \sin \theta_1) d\theta_1$$

$$d\tilde{y} = (\alpha_1 \cos \theta_1) d\theta_1 \qquad (12)$$

Then, using (1:2), we can calculate the condition for convergence of the approximate solution to the exact solution as follows:

$$\left|\frac{d\tilde{x}}{d\tilde{y}}\right| < 1 \Rightarrow \left|\frac{\sin\theta_1}{\cos\theta_1}\right| < 1 \Rightarrow |\theta_1| < 45° \qquad (13)$$

A similar result can be shown for the case where windage prism alone is being rotated by an amount $d\theta_2$:

$$\left|\frac{d\tilde{y}}{d\tilde{x}}\right| < 1 \text{ if } |\theta_2| < 45° \qquad (14)$$

EXAMPLE 4

Consider a three-prism riflescope adjustment system comprising two rotatable prisms and one fixed prism as shown in FIG. 6. Assume that $\|a_1\|=\|a_2\|=12$ MIL. This is to say, the rotatable prisms are identical and have a deviation power of 120 cm at 100 m. To produce a zero net deviation, the non-rotatable prism must have a deviation power $\|a_3\|= \sqrt{2} \times 12 = 16.97$ MIL and must be oriented such that $\angle a_3 = 225°$.

Now consider that this system is being used to adjust the point of aim of a riflescope within a 1 square meter grid at a distance of 100 m. We can simulate the-zeroing process using a computer to see how many adjustment steps it will take to bring the point of impact in alignment with the point of aim. FIGS. 7(*a*) through 7(*d*) show sample computer simulation results. In these figures it is assumed that the point of aim is at the center of the grid. Points of impact are shown using small circles.

For each plot, a different initial point of impact on the 1 m square gird is selected. The computer program then adjusts the riflescope by changing the rotation angles $\theta_1$ and $\theta_2$ in successive steps until the point of impact arrives to within 1 cm of the point of aim. The numbers 1, 2, 3 etc. poisoned near each point of impact show the number of iterations that has led to that point of impact. The point of impact with no number is the initial point of impact.

These plots show that after each adjustment step the point of impact moves closer to the point of aim and that the iterative zeroing process is convergent.

The above mathematical analysis implies that if the rotation range of prisms is reduced, a faster convergence to the exact solution can be expected. Extensive computer simulations performed by the inventor show that the convergence rate is indeed very fast when rotation range is limited to ±30° or less. In most practical cases a precise correction to the point of aim (error on target less than 1 cm at 100 m) is achieved after just two steps.

VIII. DETAILED DESCRIPTION OF THE INVENTION

A. A First Preferred Embodiment of the Invention

A first preferred embodiment of the invention is shown in FIGS. 8(a) and 8(b). With reference to these figures, the riflescope according to this invention comprises an elongated cylindrical housing 30 which houses all the optical elements. An objective lens 1 is mounted at the front end of the housing 30. The objective lens 1 forms an image of the target at its focal plane 11. The objective focal plane 11 is also called the "first focal plane" of the riflescope. A reticle 20 is positioned at (or near) the objective focal plane to designate the paint of aim.

The objective lens 1 has an optical axis 50 which constitutes the optical axis of the riflescope. All the subsequent lenses or elements are centered on this optical axis. The image formed by an objective lens is upside down and laterally reversed. Therefore, an image erector prism 17 is positioned between the objective lens 1 and the objective focal plane 11 to produce an erect image of the target at (or near) the objective focal plane 11. Persons skilled in the art are familiar with image erector prisms and can choose a suitable image erector prism such as a Schmidt-Pechan prism or an Abbe-Koenig prism for use in this invention.

An eyepiece lens 5 is positioned at the rear end of the housing 30. The eyepiece lens 5 is positioned such that its focal plane 55 is coplanar with (or close to) the objective focal plane 11. The eyepiece lens 5 produces a magnified virtual image of the target that a user can see if he positions his eye at a proper position behind the eyepiece lens. In riflescope literature, the eyepiece focal plane 55 is referred to as "the second focal plane" of the riflescope.

A pair of thin wedge prisms 41 and 42 are mounted at the front end of the housing 30 in front of the objective lens 1. As illustrated in FIG. 8(b), the prism 41 is positioned such that its deviation axis is oriented in the horizontal direction (i.e., in the direction of the x-axis). The wedge prism 42 is positioned such that its deviation axis is oriented vertically (i.e., in the direction of the y-axis). In addition, the wedge prisms 41 and 42 are mounted such that their deviation axes can be rotated in the x-y plane in a manner that they could form small angles $\theta_1$ and $\theta_2$ with respect to x-axis and y-axis, respectively. As seen in FIG. 8(b), the z-axis is defined such that it is coincident with the optical axis 50 and the x-y plane is perpendicular to the z-axis. Therefore, the deviation axes of prisms 41 and 42 always remain perpendicular to the optical axis (z-axis). Furthermore, the absolute values of the rotation angles $\theta_1$ and $\theta_2$ are limited to a pre-determined maximum amount $\theta_{max}$ which is itself less than forty-five degrees. The designer can choose a proper value for $\theta_{max}$ using the guidelines previously presented in Section VII-C.

The user can adjust the riflescope for elevation by changing $\theta_1$ and for windage by changing $\theta_2$.

B. A Second Preferred Embodiment of the Invention

A second preferred embodiment of the invention is illustrated in FIGS. 9(a) and 9(b). The riflescope according to this embodiment is essentially the same as the one described in the first embodiment above except that
(a) a third non-rotatable wedge prism 43 has been added in front of the objective lens, and
(b) it uses a "focal" erector system that comprises a lens group.

The deviation axis of the non-rotatable wedge prism 43 is oriented diagonally such that it produces a deviation in the opposite direction of the net deviation produced by the rotatable wedge prisms 41 and 42. More precisely, the wedge prism 43 is chosen and mounted such that $$\alpha_1 + \alpha_3 \cos(\theta_3) = 0 \text{ and } \alpha_2 + \alpha_3 \sin(\theta_3) = 0 \quad (15)$$

In the above formula, $\alpha_3$ represents the deviation power associated with the non-rotatable prism 43. The quantities $\alpha_1$ and $\alpha_2$ represent the deviation powers associated with the rotatable prism 41 and 42, respectively. Recall from equation (4) previously presented in Section VII.D that the above choice for the non-rotatable prism ensures that the line of sight will be coaxial with the optical axis 50 when $\theta_1$ and $\theta_2$ are zero. This is a very convenient feature (although not necessary) for a riflescope.

Another feature of the riflescope presented in this embodiment is that the non-rotatable wedge prism 43 can be positioned before, after, or in between the rotatable prism 41 and 42. In any of these configurations, when $\theta_1$ and $\theta_2$ are zero, many of the optical aberrations created by the prisms including chromatic dispersion will be cancelled as the three wedge prisms act as a plane parallel plate.

The second embodiment of the invention uses a lens group 8 as image erector. In FIG. 9(a) the lens group 8 is shown as a "black box" comprising two positive lens elements. This type of erector system takes a real image as input and produces another real image as output. As shown in FIG. 9(a), the lens group 8 is positioned between the objective focal plane 11 and the eyepiece focal plane 55.

Persons skilled in the art are familiar with designing an erector system that comprises a lens group. Said lens group may comprise a single positive lens, a compound lens (such as a doublet or a triplet), a pair of positive lenses or a pair of compound lenses. When the lens group 8 comprises a pair of lenses, it can be designed such that it produces variable magnification (zoom). This is often achieved by mounting the lenses in a sub-assembly which allows the user to change the spacing between them via a spiral cam. Any of the fixed or variable-magnification configurations used in the riflescopes commercially sold today can be used for this invention as well.

FIG. 9(a) shows a reticle 20 being positioned at (or near) the objective focal plane 20. The reticle can also be positioned at (or near) the eyepiece focal plane 55. A reticle positioned at the eyepiece focal plane will appear at a constant size to the shooter. A reticle positioned at the objective focal plane will appear larger as the magnification is increased (assuming a zoom erector system is used). Both reticle positions can be used in the riflescope according to the present invention. The reticle 20 and the erector system 8 are centered on the optical axis 50 and may be fixedly attached to the housing 30.

As in the previous embodiment, the user can adjust the riflescope for elevation and windage by changing the rotation angles $\theta_1$ and $\theta_2$ associated with wedge prisms 41 and 42, respectively.

C. A Preferred Mechanism for Rotating the Wedge Prisms

A preferred mechanism for rotating the wedge prisms is shown in FIG. 10. With reference to figure, the rotatable wedge prisms 41 or 42 are mounted inside a hollow worm wheel 62 which is driven by a worm screw 61. The hollow worm wheel 62 and the worm screw 61 together form a worm drive mechanism. A screw head or knob 63 is attached to the worm screw 61 such that it can be turned by the user.

A first function of the worm drive mechanism shown in FIG. 10 is to reduce rotational speed such that the rotation angle $\theta$ of the prism mounted inside the hollow worm wheel 62 is a fraction of the rotation angle $\lambda$ of the knob 63 turned by the user. In this capacity, the worm drive mechanism acts like a high-gear-ratio gearbox: With a single-start worm, for each 360 degree turn of the worm, the worm-wheel advances only one tooth of the gear wheel. Therefore, regardless of the worm's size (sensible engineering limits notwithstanding), the gear ratio is "number of worm wheel teeth" to 1:

$$\frac{\lambda}{\theta} = \text{number of worm wheel teeth} \qquad (16)$$

Therefore, a 20-tooth worm wheel reduces the rotational speed by the ratio of 20:1 and a 240-tooth worm wheel can produce a 240:1 reduction in the ratio of the prism rotation angle θ to the knob rotation angle λ. This significant feature of the worm drive mechanism allows for extremely precise adjustments to the point of aim of the riflescope.

A second, equally significant, function of the worm drive mechanism is to provide "self-locking". Unlike with ordinary gear trains, the direction of power or torque transmission in a worm gear mechanism is not reversible when using large reduction ratios. This is due to the greater friction involved between the worm screw and worm-wheel, and is especially prevalent when a single-start (one spiral) worm is used. This feature eliminates the possibility of the rotatable prisms 41 or 42 turning on their own.

The worm derive mechanism should be equipped with a means for limiting the rotation angle of the worm wheel to a maximum angle less than 45°. In FIG. 10, a means for limiting the rotation angle of the worm wheel 42 is shown comprising two raised teeth positioned at specific angles around the worm wheel. This illustrates one way to limit the rotation angle of the wedge prisms. Persons skilled in the art would be familiar with designing a suitable means for limiting the rotation angle of the rotatable wedge prisms.

D. Notifying the User of the Amount of Elevation and Windage Adjustments Dialed

There are practical advantages in notifying the user as to how much elevation or windage adjustment has bee dialed in the riflescope. A simple mechanism for doing this is shown in FIG. 11. With reference to this figure, a reference marker 71 is printed on the external surface of the worm wheel 62. A series of hash marks 72 are printed on the external surface of the riflescope housing 30 adjacent to the marker 71. When the worm wheel 62 rotates, the reference marker will move from one hash mark to another showing the amount of windage or elevation adjustment dialed into the riflescope.

It is preferred that the spacings between the hash marks 72 are chosen such that they display the true amount of linear adjustment measured in units such as cm at 100 m or inches at 100 yards. For small rotation angles, the spacings between the hash marks can be proportional to the rotation angle θ of the worm wheel from its reference position. However, it would be more precise if the hash mark spacings are proportional to sin(θ) as discussed in the mathematical analysis in Section VII-C.

The reference marker 71 and the hash marks 72 together form indicia that notify the user of the amount of elevation and windage adjustments dialed into the riflescope. Persons skilled in the art can design other display methods to notify the user of the amount of elevation and windage adjustments dialed into the riflescope. For the purpose of this invention, such display methods would be considered equivalent to the indicia shown in FIG. 11.

E. Using Achromatic Prisms

A wedge prism deviates light beams of different color at slightly different angles. This is because the refraction index n in (1) depends on the wavelength of the light ray being refracted by the prism. One can obtain the value of n for standard red (C=656 nm), green (e=546 nm) and blue (F=486 nm) wavelengths from glass manufacturers such as Schott AG of Mainz, Germany. Since the exact amount of deviation produced by a wedge prism is wavelength dependent, a certain amount of "color dispersion" or "chromatic error" will be introduced when prisms are used for deviating natural fight.

With reference to FIG. 12(*a*), if a beam of polychromatic light passes through a wedge prism, the colors will separate. It is common to calculate the deviation angle α of a wedge prism at the green e wavelength. The difference between red C and blue F wavelength deviations will be considered as chromatic error. (Note: The amount of color separation is highly exaggerated in FIG. 12(*a*) for the purpose of illustration)

Since the wedge prisms used in the present invention have very small deviation power, the chromatic error will be negligible. Nonetheless, it might be advantageous for some special applications to further reduce chromatic color separation. This can be achieved by using achromatic wedge prisms.

With reference to FIG. 12(*b*), an achromatic prism is made of two different glass types and is characterized by two apex angles $\xi_1$ and $\xi_2$. The glasses and the apex angles are chosen such that two wavelengths (usually the red C and the blue F standard wavelengths) exit the prism at the same deviation angle. A small difference between the deviation angle of the green e wavelength and the common deviation angle of the other two wavelengths will still remain.

The design of achromatic prisms is well-known in the field of optics. Persons skilled in the art can easily design achromatic prisms suitable for use in the present invention.

IX. HOW TO USE THE RIFLESCOPE DESCRIBED IN THIS INVENTION

The riflescope disclosed in this invention can be used in much the same way as conventional riflescopes. A shooter should mount the riflescope on his rifle using rings or rails or any other well-known forms of mounting. It is best to use high quality mounts so that the optical axis of the riflescope is as close to being parallel with the rifle's barrel as possible. Once the riflescope is securely attached to the rifle, the user must test-fire the rifle at a shooting range or other suitable place aiming at a target positioned at a known distance (say 100 m). The shooter must then observe the point of impact of his rifle and measure the horizontal and vertical distance between the point of impact and the point of aim on target. If a correction is needed, the shooter can dial in the required horizontal adjustment by changing the angle $\theta_2$ associated with wedge prism 42. A vertical adjustment can be dialed in by changing the angle $\theta_1$ associated with wedge prism 41. The shooter should now fire the rifle again to verify his corrected point of impact. If the point of impact still does not match the point of aim, the shooter can adjust the rotation angles $\theta_1$ and $\theta_2$ again to compensate for the reaming small discrepancy. Once adjusted, the riflescope will provide an extremely reliable point of aim.

X. ADVANTAGES

Figure 1:
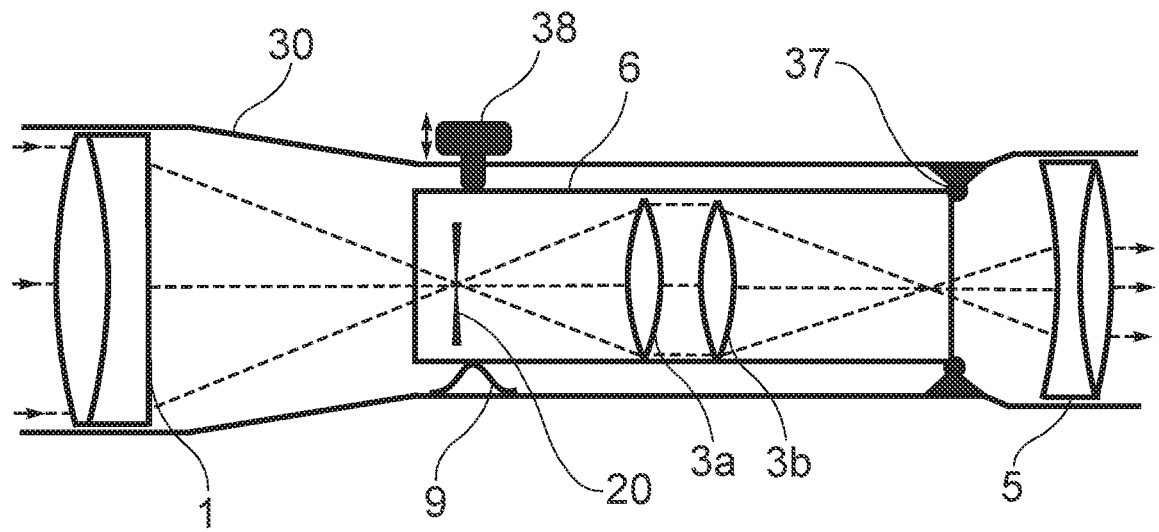
FIG. 1 is a side-view schematic showing a common optical design for riflescopes.
Figure 2:
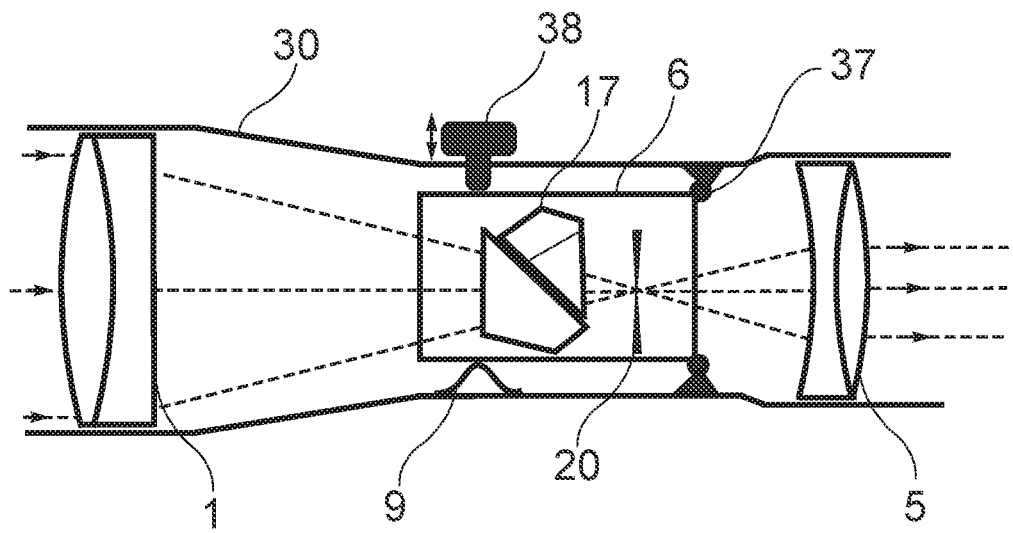
FIG. 2 is a side-view schematic showing another common optical design for riflescopes.

A riflescope according to this invention has significant advantages over the prior art including but not limited to:

1. HIGHER RELIABILITY: In this invention, the lenses, the reticle and the erector system are securely attached to the housing. The prisms are also mounted inside a self-locking worm wheel. Therefore, there is no possibility for the point of aim to shift due to the rifle's recoil or rough usage in the field.
2. REDUCED COMPLEXITY: Compared with the prior art riflescopes shown in FIGS. 1 and 2, the present invention does not need the turret 38, the tillable inner tube 6, the precision hinge 37 and the supporting spring 9.
3. HIGHER IMAGE RESOLUTION: In conventional riflescopes, the erector system (whether is made of prisms or lenses) is tilted together with the reticle so that the reticle always appears centered in the field of view. The resulting reentering of the optical components causes a plurality of optical aberrations and image quality is compromised. In the present invention, all optical elements are centered on the main optical axis producing the highest possible image resolution.
4. TURRETLESS BODY: In conventional riflescopes, two turrets are attached to the tubular body of the riflescope to allow for elevation and windage adjustments. The riflescope introduced in the present invention does not need turrets. The housing can be smooth and streamlined. The streamlined housing not only makes the scope aesthetically more pleasing but also easier to mount on a rifle (see FIG. 11).
5. ADJUSTMENTS BECOME INDEPENDENT OF MAGNIFICATION AND OBJECTIVE FOCAL LENGTH: In the prior art mechanisms shown in FIGS. 1(*a*) and (*b*), the turret mechanisms must be designed such that the position of the reticle on target is shifted by a standard amount per each click (usually 0.1 Mil). This apparent shift on target depends on both the amount the reticle assembly is shifted and the focal length of the objective lens. Therefore, the turret mechanism must be re-designed for each riflescope model having a different objective focal length. In the present invention, both the adjustment range and adjustment resolution are independent of the objective lens focal length. Once a proper design is made for the rotatable prisms and their associated worm-drive mechanism, this same design can be used to adjust any riflescope with any magnification or objective focal length. This "one-design-fits-all" feature can help reduce manufacturing costs.

XI. CONCLUSION

The foregoing disclosure is believed to be sufficient to enable an ordinary person skilled in the art to build and use the invention. In addition, the description of specific embodiments will so fully reveal the general nature of the invention that others can, by applying current knowledge, readily modify and/or adapt for various applications such specific embodiments without undue experimentation and without departing from the generic concept. For example:
1. The present invention can be combined with the mechanisms and teachings disclosed by the present inventor in U.S. Pat. No. 8,749,887 issued on Jun. 10, 2014, U.S. Pat. No. 9,164,269 issued on Oct. 20, 2015, and U.S. Pat. No. 9,644,620 issued on May 9, 2017. For example, one may use the mechanism disclosed in the present invention for windage adjustment and use the mechanism disclosed in U.S. Pat. No. 8,749,887 for elevation adjustment.
2. The present invention can also be combined with the mechanisms and techniques disclosed by the present inventor in U.S. patent application Ser. No. 15/990,815 filed on May 28, 2018. In this case, it might be advantageous to use the methods and techniques in said patent application for bringing the point of impact on target (i.e. for coarse adjustments) then use the mechanisms and techniques disclosed in the present invention to "fine-tune" the point of aim of the riflescope.
3. It is possible to use gradient-index (also called graded-index) optical elements to provide a deviating optical device similar to a wedge prism. For the purposes of this invention, a gradient-index "prism" will be considered equivalent to a conventional wedge prism and maybe used as a substitute.
4. It is possible to substitute the wedge prisms with Fresnel prisms for use in the present invention. A Fresnel prism is a thin, transparent sheet which induces a prismatic effect. One side of the sheet consists of a series of grooves (prisms) and the other side is smooth. A Fresnel prism can be made cheaply using plastic.

Therefore, such adaptations and modifications should and are intended to be comprehended within the meaning and range of equivalents of the disclosed embodiments.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

REFERENCES

[1] S. D. Risley, *A new Rotary Prism*, Transactions of the American Ophthalmological Society, Vol. 5, pp. 412-413, 1889
[2] Christopher T. Amrault and Charls A. Dimarzio, *Precision Pointing using a Dual-Wedge Scanner*, NASA Contrcator Report 3946, National Aeronatics and Spoace Adminstration, November 1985.
[3] Miroslaw Ostaszewski, Steven Harford, Neil Doughty, Charlie Hoffman, Michael Sanchez, David Gutow, Robert Pierce (Ball Aerospace & Technologies Corp.), *Risley Prism Beam Pointer*, SPIE Proceedings Vol. 6304, September 2006.
[4] Yajun Li, *Closed form analytical inverse solutions for Risley-prism-based beam steering systems in different configurations*, Applied Optics, Vol. 50, No. 22, August 2011.
[5] Yong-Geun Jeon, *Generalization of the first-order formula for analysis of scan patterns of Risley prisms*. Optical Engineering, Vol. 50, No. 11, November 2011.
[6] Yafei Lu, Yuan Thou, Mo Hei, and Dapeng Fan, *Theoretical and experimental determination of steering mechanism for Risley prism systems*, Applied Optics, Vol. 52, No. 7, March 2013
[7] Anhu Li, Xinjian Ciao, Wansong Sun, Wanli Yi, Yongming Blau, Hongzhan Liu, and Liren Lin, *Inverse solutions for a Risley prism scanner with iterative refinement by a forward solution*, Applied Optics Vol. 54, No. 33, November 2015.

What is claimed is:
1. A riflescope for providing an adjustable point of aim for a weapon, comprising:
 a. a housing, said housing having a front end, a rear end and a middle section;

b. an objective lens, said objective lens being mounted inside said housing at said front end of said housing, said objective lens having an optical axis and a first focal plane, said optical axis being constituted in a coordinate system having three axes perpendicular to each other, said three axes being referred to as x-axis, y-axis and z-axis, said coordinate system being oriented such that said z-axis coincides with said optical axis;

c. an erector prism, said erector prism being fixedly mounted inside said housing, said erector prism being positioned after said objective lens, said erector prism together with said objective lens forming an erect image of a target at said first focal plane;

d. a reticle for designating said point of aim, said reticle being fixedly mounted inside said housing, said reticle being positioned at or near said first focal plane;

e. an eyepiece lens for converting said erect image into a virtual image viewable by a shooter, said eyepiece lens being mounted after said erector prism, said eyepiece lens being mounted inside said housing at said rear end of said housing;

f. a first wedge prism, said first wedge prism being rotatably mounted inside said housing at said front end, said first wedge prism being mounted before said objective lens, said first wedge prism having a first deviation power $\alpha_1$, said first wedge prism having a first deviation axis, said first deviation axis being always perpendicular to said z-axis, said first deviation axis being rotatable around said z-axis, said first deviation axis forming a first rotation angle $\theta_1$ with respect to said x-axis, said first rotation angle $\theta_1$ being adjustable by said shooter within a first predetermined range $\pm\theta_1^{max}$, $\theta_1^{max}$ being less than or equal to 45 degrees;

g. a second wedge prism, said second wedge prism being rotatably mounted inside said housing at said front end, said second wedge prism being mounted before said objective lens and after said first wedge prism, said second wedge prism having a second deviation power $\alpha_2$, said second wedge prism having a second deviation axis, said second deviation axis being always perpendicular to said z-axis, said second deviation axis being rotatable around said z-axis, said second deviation axis forming a second rotation angle $\theta_2$ with respect to said y-axis, said second rotation angle $\theta_2$ being adjustable by said shooter within a second predetermined range $\pm\theta_2^{max}$, $\theta_2^{max}$ being less than or equal to 45 degrees;

whereby said shooter can adjust said point of aim along said y-axis by rotating said first wedge prism and adjust said point of aim along said x-axis by rotating said second wedge prism.

2. The riflescope of claim 1 further comprising:

h. a third wedge prism, said third wedge prism being fixedly mounted inside said housing before said objective lens, said third wedge prism having a third deviation power $\alpha_3$, said third wedge prism having a third deviation axis, said third deviation axis forming a fixed angle $\theta_3$ with respect to said x-axis.

3. The riflescope of claim 2 further comprising said first wedge prism or said second wedge prism being mounted inside a hollow worm wheel, said hollow worm wheel being rotatable around said optical axis, said hollow worm wheel meshing with a worm screw, said worm screw being rotatable around an axis perpendicular to said optical axis, said worm screw being rotatable by said shooter.

4. The riflescope of claim 2 further comprising said first wedge prism, said second wedge prism and said third wedge prism being achromatic.

5. The riflescope of claim 1 further comprising said first wedge prism or said second wedge prism being mounted inside a hollow worm wheel, said hollow worm wheel being rotatable around said optical axis, said hollow worm wheel meshing with a worm screw, said worm screw being rotatable around an axis perpendicular to said optical axis, said worm screw being rotatable by said shooter.

6. The riflescope of claim 1 further comprising said first wedge prism and said second wedge prism being achromatic.

7. A riflescope for providing an adjustable point of aim for a weapon, comprising:

a. a housing, said housing having a front end, a rear end and a middle section;

b. an objective lens to form a first image of a target, said objective lens being mounted inside said housing at said front end of said housing, said objective lens having an optical axis and a first focal plane, said optical axis being constituted in a coordinate system having three axes perpendicular to each other, said three axes being referred to as x-axis, y-axis and z-axis, said coordinate system being oriented such that said z-axis coincides with said optical axis;

c. an erector lens group to convert said first image into an erect image, said erector lens group being mounted inside said housing after said first focal plane;

d. a reticle for designating said point of aim, said reticle being positioned coplanar with said first image or said erect image;

e. an eyepiece lens for converting said erect image of said target into a virtual image of said target viewable by a shooter, said eyepiece lens being mounted after said erector lens group, said eyepiece lens being mounted inside said housing at said rear end of said housing;

f. a first wedge prism, said first wedge prism being rotatably mounted inside said housing at said front end, said first wedge prism being mounted before said objective lens, said first wedge prism having a first deviation power $\alpha_1$, said first wedge prism having a first deviation axis, said first deviation axis being always perpendicular to said z-axis, said first wedge prism being rotatable around said z-axis, said first deviation axis forming a variable angle $\theta_1$ with respect to said x-axis, said variable angle $\theta_1$ being adjustable by a user said shooter within a first predetermined range $\pm\theta_1^{max}$, $\theta_1^{max}$ being less than or equal to 45 degrees;

g. a second wedge prism, said second wedge prism being rotatably mounted inside said housing before said objective lens and after said first wedge prism, said second wedge prism having a second deviation power $\alpha_2$, said second wedge prism having a second deviation axis, said second deviation axis being always perpendicular to said z-axis, said second wedge prism being rotatable around said z-axis, said second deviation axis forming a variable angle $\theta_2$ with respect to said y-axis, said variable angle $\theta_2$ being adjustable by said user shooter within a second predetermined range $\pm\theta_2^{max}$, $\theta_2^{max}$ being less than or equal to 45 degrees;

whereby said shooter can adjust said point of aim along said y-axis by rotating said first wedge prism and adjust said point of aim along said x-axis by rotating said second wedge prism.

8. The riflescope of claim 7 further comprising:

h. a third wedge prism, said third wedge prism being fixedly mounted inside said housing before said objective lens, said third wedge prism having a third deviation power $\alpha_3$, said third wedge prism having a third deviation axis, said third deviation axis forming a fixed angle $\theta_3$ with respect to said x-axis.

9. The riflescope of claim 8 further comprising said first wedge prism or said second wedge prism being mounted inside a hollow worm wheel, said hollow worm wheel being rotatable around said optical axis, said hollow worm wheel meshing with a worm screw, said worm screw being rotatable around an axis perpendicular to said optical axis, said worm screw being rotatable by said shooter.

10. The riflescope of claim 8 further comprising said first wedge prism, said second wedge prism and said third wedge prism being achromatic.

11. The riflescope of claim 7 further comprising said first wedge prism or said second wedge prism being mounted inside a hollow worm wheel, said hollow worm wheel being rotatable around said optical axis, said hollow worm wheel meshing with a worm screw, said worm screw being rotatable around an axis perpendicular to said optical axis, said worm screw being rotatable by said shooter.

12. The riflescope of claim 7 further comprising said first wedge prism and said second wedge prism being achromatic.

\* \* \* \* \*